UNITED STATES PATENT OFFICE.

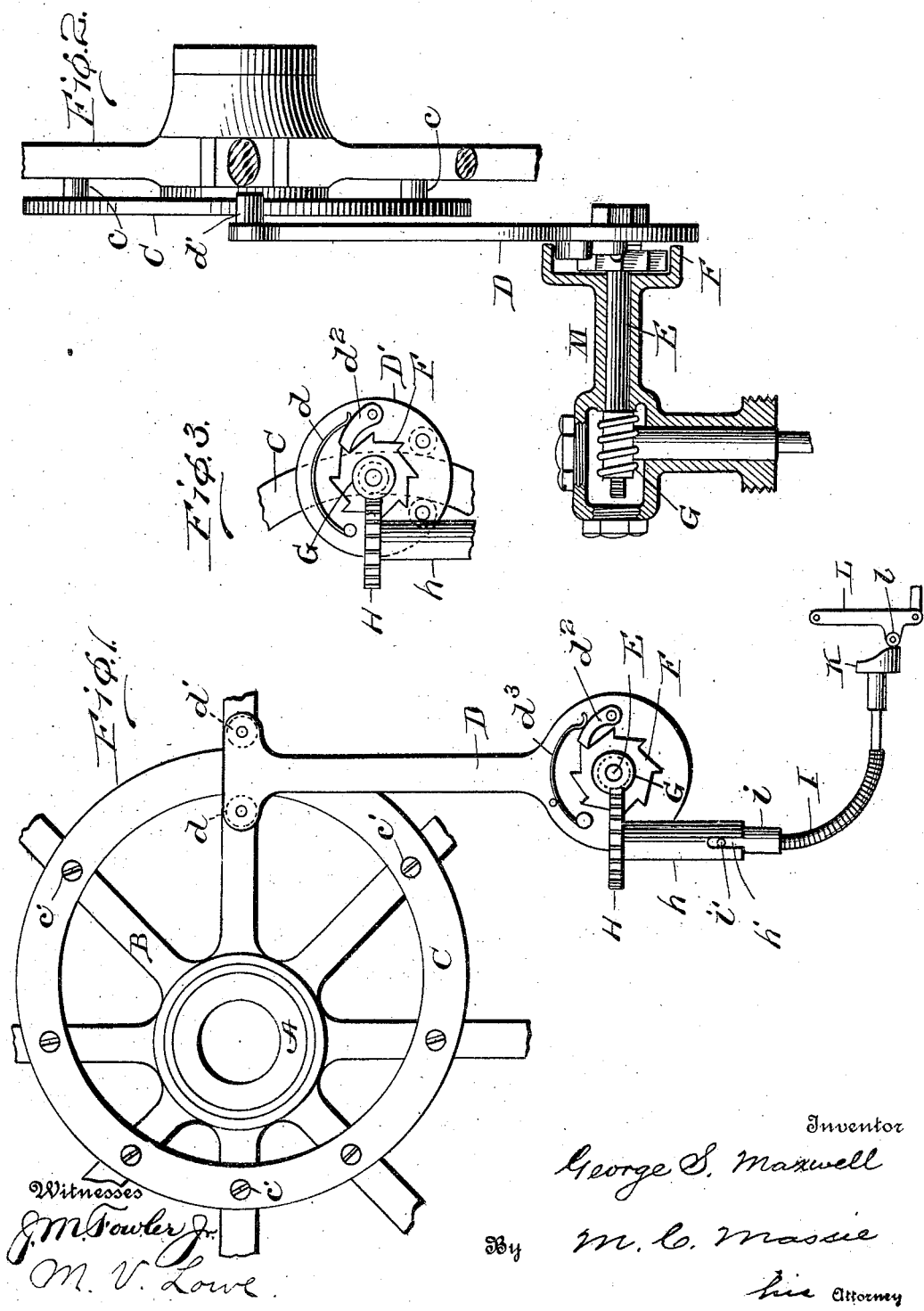

GEORGE S. MAXWELL, OF NEWARK, NEW JERSEY.

TRANSMISSION-GEARING.

1,039,425.  Specification of Letters Patent.  Patented Sept. 24, 1912.

Application filed October 27, 1911. Serial No. 657,036.

*To all whom it may concern:*

Be it known that I, GEORGE S. MAXWELL, a citizen of the United States, residing at Newark, in the county of Essex and State of New Jersey, have invented certain new and useful Improvements in Transmission-Gearing, of which the following is a specification.

My invention relates to improvements in transmission gearing and in particular to a transmission device for use in transmitting power from a vehicle wheel to mechanism mounted on the vehicle body and arranged to be driven from the wheel, such for example, as taximeters, speed recorders, and the like. Of the many devices heretofore employed for such purposes, the flexible shaft, with gearing connecting it to the vehicle wheel, has been considered the best, owing to its simplicity, ease of installation on a vehicle, and light weight. However, it has heretofore been considered a necessity of the use of a flexible shaft to run it at a relatively high speed, with the idea that in this way it would be subjected to the least amount of strain. If considered merely from the standpoint of power transmission this idea is correct, because with a high speed of rotation of the shaft, a given amount of power could be transmitted with a small force acting torsionally on the flexible shaft. I have found, however, that these usual methods of employing a flexible shaft result in the rapid deterioration or destruction of the shaft, whereby the cost of frequently replacing the parts and the interruption of service become serious disadvantages.

I have found that a flexible shaft can be made to transmit the desired amount of power without being driven at such a rapid speed and yet without being made so large in diameter as to lose the advantage of the flexibility of such shaft. By this decreased speed of rotation, the durability of the flexible shaft is increased to an extent which is more than proportional to the decrease of speed. In fact, I have found that by my arrangement, I can produce a transmission gearing comprising a flexible shaft and having all the advantages of the usual flexible shaft transmission devices without any of its disadvantages.

My invention comprises in combination with a flexible shaft, a new means for driving said shaft at a relatively slow rate of speed from the ordinary vehicle wheel and even from an angularly adjustable steering wheel, said driving means being of such construction that it may readily be adjusted to various sizes of wheels while driving the desired mechanism at a fixed rate of speed relative to the distance traveled by the vehicle. Furthermore, the said driving means is of simple and economical construction.

My invention will first be described in its proposed embodiment in connection with the accompanying drawings and then particularly pointed out in the claims.

In the drawings,—Figure 1 is a diagrammatic side elevation of so much of a transmission gearing as is necessary to explain my invention; Fig. 2 is a diagrammatic plan view of the same; Fig. 3 is a detail view illustrating a modified form of my invention.

Referring to the drawings, A indicates a vehicle wheel hub, from which the spokes B, radiate, a part only of said spokes being shown. To the spokes is secured a cam device, in this case formed as a cam-ring, indicated at C, said ring being eccentric to the wheel hub. The said cam-ring is spaced away from the spokes by suitable spacing thimbles $c$, and the ring is held in place on the wheel by countersunk bolts, $c'$.

At D is indicated a lever loosely fulcrumed on a shaft E. The said lever has one end widened and provided with rollers $d, d'$, arranged to run in contact with the cam-ring, C, one of said rollers, $d$, being on the inside of the ring and the other, $d'$, on the outside, whereby, owing to the eccentricity of the ring with relation to the vehicle wheel, the lever E will be oscillated by the rotation of the wheel, and in the construction shown, it will be oscillated once for each revolution of said wheel. The fulcrum end of the lever D is, in the present example, widened out as shown in Fig. 1, and on this widened portion is pivotally mounted a pawl $d^2$, and a pawl spring $d^3$, which bears against said pawl. To the shaft E is secured a ratchet wheel F arranged to be engaged by the pawl $d^2$. Also to the shaft is fixed a worm G, arranged to mesh with a worm-wheel H, fixed to a flexible shaft I. In the present example the worm-wheel is shown as provided with a long hub, $h$, which is tubular and provided with a longitudinal slot as indicated at h'. The flexible shaft I has its end provided with the usual solid portion i arranged to enter the tubular hub h of the worm-wheel, said flexible shaft also having a pin i' which enters the slot h' of the worm-wheel hub. Therefore, when the worm-wheel H is rotated the flexible shaft I will be rotated, also, because of the pin i' engaging the slot h'. At the same time, the end of the flexible shaft is permitted a certain amount of freedom of movement longitudinally in the tubular hub of the worm-wheel, to compensate for difference in curvature of the flexible shaft.

In the drawings, Fig. 1, I have shown the flexible shaft as provided with a cam K having an operating surface on one end and arranged to actuate a lever L, which has a roller l bearing against the operating surface of the cam K. The lever L is supposed to represent a part of the mechanism of a taximeter, speed recorder, or the like device mounted on the vehicle and intended to be operated from the vehicle wheel.

For the purpose of mounting the mechanism, the shaft E and the worm-wheel H may be journaled in a suitable housing or bearings, as indicated in outline at M, Fig. 2, which housing may be mounted on any suitable part of the vehicle.

The device shown is so arranged that each revolution of the vehicle wheel will cause one complete oscillation of the lever D, and this in turn will move the ratchet wheel F one tooth. By suitably proportioning the worm G and the worm-wheel H, the flexible shaft, I, may have the desired number of revolutions relative to one revolution of the wheel. From my experience, I have found that when the flexible shaft is given one or two revolutions for each mile of travel of the vehicle wheel, the shaft may be made strong enough to transmit all the power usually required for operating taximeters, speed recorders and the like, and yet still be flexible enough for the desired purposes, and, owing to its reduced speed of rotation will be practically indestructible in ordinary use.

In Fig. 3, I have shown a modification of my invention wherein the lever is shortened to such an extent that it in fact resembles a mere disk, as indicated at D'. Of course, the principle involved is identical with that of the construction shown in Figs. 1 and 2, but by the short lever as shown, the apparatus may be installed in places where the long lever of Fig. 1 would be inapplicable.

Having thus fully described my invention, what I claim is:

1. In a transmission gearing, the combination, with a vehicle wheel, a cam ring secured to said wheel, and a lever fulcrumed at one end and provided at the other end with means for engaging the inside and the outside respectively of the cam ring, of a flexible shaft, means actuated by said lever for converting oscillatory motion into rotary motion, and a connection between said means and the flexible shaft.

2. In a transmission gearing, the combination, with a flexible shaft, and a rotatable cam device, of a lever arranged to be oscillated by the cam device, a pawl carried by said lever, a ratchet wheel arranged to be moved by the pawl, and reducing gearing driven by the ratchet wheel and arranged to rotate the flexible shaft.

3. In a transmission gearing, the combination, with a flexible shaft, and a rotatable cam device, of a lever arranged to be oscillated by the cam device, a pawl carried by said lever, a ratchet wheel engaged by the pawl, a worm driven by the ratchet wheel, and a worm-wheel in mesh with the worm and arranged to drive the flexible shaft.

4. In a transmission gearing, the combination, with a flexible shaft, a cam-ring arranged to be secured to a vehicle wheel, and a lever provided with means for engaging the ring at each side thereof, of a pawl carried by said lever, a ratchet-wheel engaged by the pawl, a worm driven by the ratchet-wheel, and a worm-wheel fixed to the flexible shaft and engaging with the worm.

5. In a transmission gearing, the combination, with a vehicle wheel, a cam-ring secured to said wheel, a lever fulcrumed at one end and provided at the other end with rollers arranged one inside and the other outside the cam-ring and in contact therewith, a spring-pressed pawl carried by the lever, a shaft, a ratchet-wheel fixed thereon and engaged by the pawl, a worm fixed on said shaft, a worm-wheel engaging said worm, and a flexible shaft to which said worm-wheel is connected.

In witness whereof I have hereunto affixed my hand this 25th day of October, 1911.

GEORGE S. MAXWELL.

Witnesses:
M. C. MASSIE,
J. H. SIGGERS.

Copies of this patent may be obtained for five cents each, by addressing the "Commissioner of Patents, Washington, D. C."